(12) United States Patent
Bender et al.

(10) Patent No.: US 11,934,552 B2
(45) Date of Patent: Mar. 19, 2024

(54) SELECTIVE KNOWLEDGE CORPUS SHARING

(71) Applicant: International Business Machines Corporation, Armonk, NY (US)

(72) Inventors: Michael Bender, Rye Brook, NY (US); Sarbajit K. Rakshit, Kolkata (IN); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1214 days.

(21) Appl. No.: 16/528,830

(22) Filed: Aug. 1, 2019

(65) Prior Publication Data

US 2021/0034775 A1 Feb. 4, 2021

(51) Int. Cl.
*G06F 21/62* (2013.01)
*G06F 16/182* (2019.01)
*G06N 3/02* (2006.01)
*G06N 3/04* (2023.01)
(Continued)

(52) U.S. Cl.
CPC ...... *G06F 21/6227* (2013.01); *G06F 16/1824* (2019.01); *G06N 3/02* (2013.01);
(Continued)

(58) Field of Classification Search
CPC ........ G06F 16/1824; G06N 3/02; G06N 3/04; G06N 5/02; G06N 5/043
See application file for complete search history.

(56) References Cited

U.S. PATENT DOCUMENTS 8,694,686 B2 4/2014 Roth
8,812,507 B2 8/2014 Cofino
(Continued)

FOREIGN PATENT DOCUMENTS

CN 103747067 A 4/2014
CN 109101226 A 12/2018
(Continued)

OTHER PUBLICATIONS

Saha, Rahul, et al. "Privacy Ensured \${e} \$-healthcare for fog-enhanced IoT based applications." IEEE Access 7 (2019): 44536-44543. (Year: 2019).*

(Continued)

*Primary Examiner* — Kevin W Figueroa
(74) *Attorney, Agent, or Firm* — Brandon L. Stephens; Christopher M. Pignato

(57) ABSTRACT

Systems, methods, and computer program products for selectively customizing, modifying and changing performance parameters, capabilities and behaviors of AI devices within AI device networks by sharing user-selected portions of a knowledge corpus with other AI device networks. Selectively sharing parameters, learned behaviors, capabilities, and features of the knowledge corpus allows for AI devices within a second AI device network to mimic, clone or recreate the performance or behaviors of AI devices operating within the environment of a first AI device network. Users can create portable nodes that travel with the user and upon connecting with the second device network, identify AI devices that can be modified using the portions of the knowledge corpus to recreate selected portions of the first AI device network within the environment of the second AI device network either permanently or for a user-selected amount of time.

17 Claims, 8 Drawing Sheets

(51) Int. Cl.
G06N 5/02 (2023.01)
G06N 5/043 (2023.01)

(52) U.S. Cl.
CPC ............ *G06N 3/04* (2013.01); *G06N 5/02* (2013.01); *G06N 5/043* (2013.01)

(56) References Cited

U.S. PATENT DOCUMENTS

| | | | |
|---|---|---|---|
| 10,007,779 B1 * | 6/2018 | McClintock | G06F 21/31 |
| 10,140,322 B2 | 11/2018 | Donneau-Golencer | |
| 2016/0132029 A1 | 5/2016 | Ng | |
| 2016/0338072 A1 * | 11/2016 | Cohen | H04L 43/0876 |

FOREIGN PATENT DOCUMENTS

| | | |
|---|---|---|
| WO | 201942389 A1 | 3/2019 |
| WO | 2019103356 A1 | 5/2019 |

OTHER PUBLICATIONS

Dong, Xin, et al. "Achieving an effective, scalable and privacy-preserving data sharing service in cloud computing." Computers & security 42 (2014): 151-164. (Year: 2014).*

Mell et al., "The NIST Definition of Cloud Computing", Recommendations of the National Institute of Standards and Technology, NIST Special Publication 800-145, Sep. 2011, 7 pages.

"How do I share a corpus with another master dashboard?", Ideas and Knowledge Base for Netvibes, Dec. 27, 2018, 1 page, <http://faq.netvibes.com/knowledgebase/articles/492726-how-do-i-share-a-corpus-with-another-master-dashboard>.

* cited by examiner

US 11,934,552 B2

SELECTIVE KNOWLEDGE CORPUS SHARING

TECHNICAL FIELD

The present disclosure relates generally to the field of artificial intelligence and more specifically to user-selective portable sharing of artificial intelligent (AI) knowledge between AI device networks.

BACKGROUND

Artificial intelligence is a simulation of the processes of human intelligence by machines, in particular, computer systems. The processes for integrating AI into computer systems, devices, and components that make up device networks and the Internet-of-Things (IoT) can include systematic learning through the acquisition of information and rules associated with using the information, reasoning using the rules to reach approximate or definitive conclusions and/or self-correction. The cognitive abilities of AI can vary between systems or networks of systems. A systems and networks can be designed and trained to complete a particular task or for receiving and implementing general tasks requested by users. For example, virtualized personal assistants can be integrated into a computer network and collect data from each of the systems or devices of the network, allowing for humans to interact with AI systems and networks as well as influence the tasks and services provided as output by the A system.

Artificial intelligence can be classified into three different types of systems, analytical, human-inspired and humanized artificial intelligence. Analytical AI has characteristics consistent with cognitive intelligence and can generate cognitive representations of the world using learning algorithms based on past experiences to inform future decisions. Human-inspired AI can have elements of cognitive and emotional intelligence, that allows for the understanding of human emotions in addition to cognitive elements, allowing for the AI to consider the human emotions as part of the decision-making by the A system. Humanized A display characteristics of cognitive, emotional and social intelligence as part of the A system's decision-making process and can be self-conscious and self-aware of the AI system's interactions with humans or other AI systems.

SUMMARY

Embodiments of the present disclosure relate to a computer-implemented method, an associated computer system and computer program product for selectively sharing a knowledge corpus of an AI device network with a second A device network to transfer, recreate, clone or apply one or more parameters, features, learned behaviors or capabilities of the first device network within the environment of the second device network. The computer-implemented method comprises: selecting, by at least one processor, one or more parameter, capability or learned behavior (a "user-selected parameter") from a knowledge corpus created from data collected by a first set of network devices connected to a first device network; identifying, by the at least one processor, a node of the knowledge corpus, the node comprising at least one replacement variable comprising a replacement value associated with the user-selected parameter; creating, by the at least one processor, a private cloud corpus by uploading the knowledge corpus to a private cloud; sharing, by the at least one processor, access to the private cloud corpus with a second device connected to a second device network; substituting, by at least one processor, an existing value of a second knowledge base accessed by the second device with the replacement value provided by the private knowledge corpus 137, wherein substituting the existing value with the replacement value modifies the second device to operate in accordance with the user-selected parameter of the first set of network devices.

DETAILED DESCRIPTION

Figure 1A:
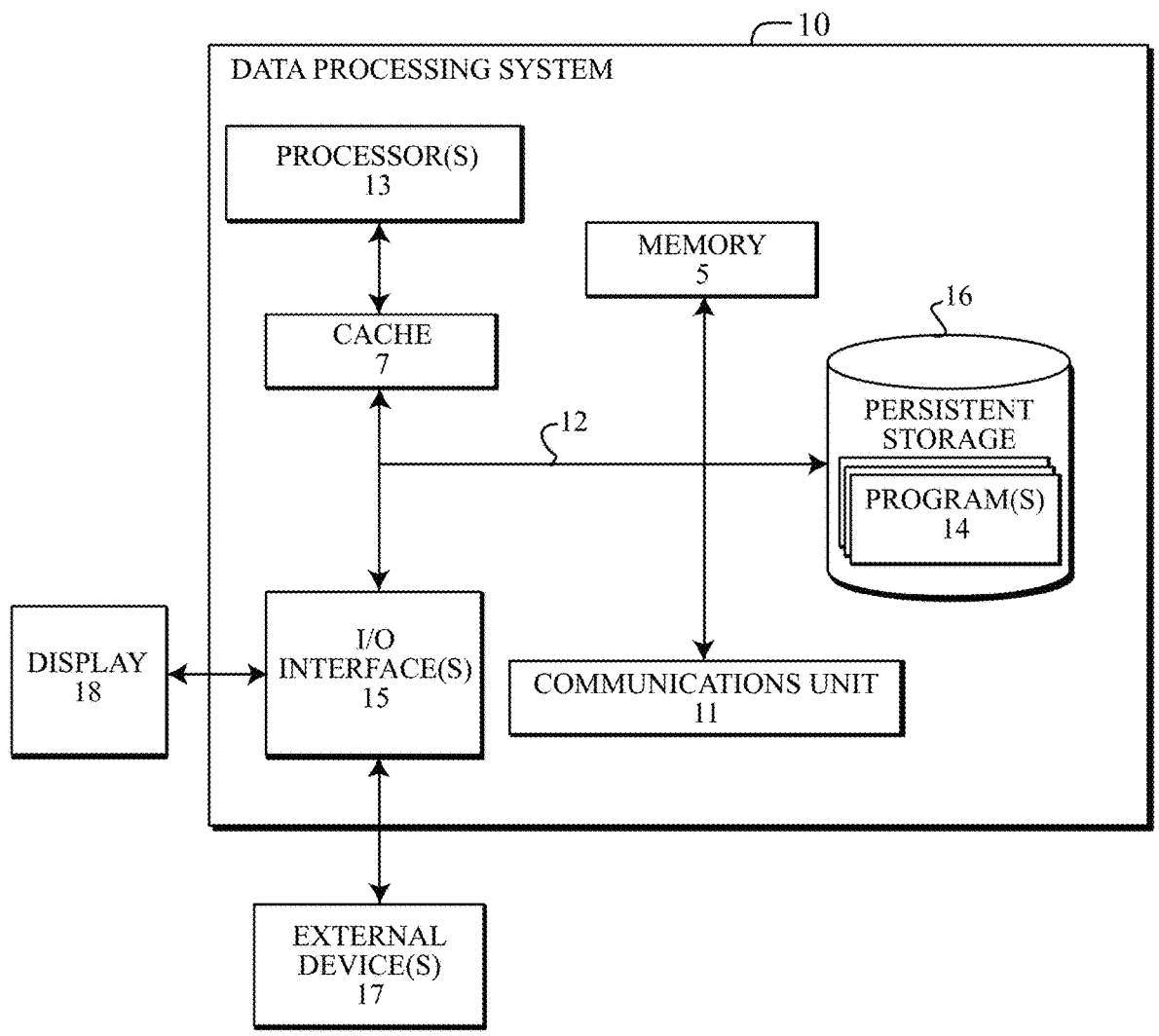
FIG. 1a depicts an embodiment of a block diagram of internal and external components of a data processing system in which embodiments of methods described herein may be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

Overview

End-users continue to adopt artificially intelligent technology and integrate the AI technology into computing environments used and managed by users. These computing environments can include (but not limited to) examples such as work and home environments as well as environments within vehicles (private or public transportation) and public locations. As users become more connected with device networks and environments through the accelerated adoption of smart devices, IoT devices, sensor devices and through the ubiquitous integration of virtual assistants and hubs, users are becoming more dependent on the capabilities of A devices inside a user's environment. Embodiments of the present disclosure recognize that AI devices and systems may require significant portions of time to manually re-train new AI device networks and environments, in order to learn user preferences and behaviors each time a user changes from an established AI-accessible environment to another independent environment. Even when a new independent environment includes AI-enabled devices or systems, retraining and customization may be required to teach the new environment to behave in a manner that replicates one or more of the user's existing A environments or device networks. These newly visited environments must be fine-tuned manually to the preferences and learned behaviors of the user. Users often lack the ability to automatically control and selectively customize each newly-visited environment surrounding the user.

Embodiments of the present disclosure recognize the shortcomings of existing AI device network knowledge sharing and the inability to provide user-selected portability of existing AI environments to new environments. In particular, the inability to selectively share specific portions of existing A knowledge, including user-specific preferences, parameters, settings, learned behaviors, device capabilities, features, and skills. Embodiments of the present disclosure improve existing AI device networks by allowing users to selectively share one or more portions of a knowledge corpus associated with an existing device network with other device networks. As a result, the environment of the device networks receiving the shared information of the existing knowledge corpus can selectively operate, function or behave in a similar or identical manner to the user's own, customized, device network environment, automatically, without having to manually set up, retrain or fine-tune the new device network to operate or behave in the same manner as an existing device network. Such portability of user-selected portions of a knowledge corpus allows for users to clone and/or selectively share the user-selected parameters, including one or more settings, learned behaviors or responses, programmed tasks, capabilities or features from one device network to another, for a user-defined amount of time. In some embodiments, replication of the user-selected parameters can be permanently imparted from existing device networks to new device networks.

Embodiments of the present disclosure can selectively share one or more nodes of a knowledge corpus associated with a first device network, with a second device network. A user may build a privately accessible knowledge corpus from knowledge corpuses of an existing knowledge base. The user may select one or more desired features, connections, parameters, settings, learned patterns, behaviors, scheduled tasks, and/or device capabilities (referred to collectively herein as simply "user-selected parameters") to share with eligible devices of the second device network that are capable of operation using the user-selected parameters. The user-selected parameters applied to the second device network can modify the operations, activities, response patterns and behavior of the second device network, simulating or cloning portions of the existing device network the user has previously built, trained or customized. The application of user-selected parameters onto the AI devices of the second device network may occur even though different types and kinds of devices may be present in the first device network and the second device network, identical AI devices are not necessary for user-selected parameters to be applied and knowledge to be transferred between the device networks.

Embodiments of the present disclosure may evaluate the second device network and identify one or more different types of devices, connections, and systems that may be connected to the device networks, and evaluate which devices are capable of implementing one or more of the user-selected parameters. Embodiments of the present disclosure may identify one or more replaceable variables of a knowledge corpus that can be altered with a replacement value, based on the user-selected parameters. Embodiments of the present disclosure may share access credentials to a privately accessible knowledge corpus built based on the user-selected parameters and share the private corpus with each device of the second device network identified as being suitable for implementing one or more of the selected parameters. Upon connection to the privately accessible knowledge corpus by the systems, devices, sensors, etc., of the second device network, a substitution of replaceable variables having existing values within the second device network's knowledge corpus with the replacement values of the user-selected parameters (either temporarily or permanently) may occur. As a result of inserting the replacement values of the private knowledge corpus 137 for each identified replacement variable, the second device network may operate or behave (at least in part) in a manner similar to the user's first device network or environment from which the user-selected parameters were elected to be transferred, copied or cloned by the user.

Embodiments of the present disclosure may include a portable node. During the creation of the private knowledge corpus 137, embodiments of the portable node may be provided with access credentials to the private knowledge corpus 137. When the portable node is within range of the second device network or able to connect thereto, the portable node may connect to the second device network, identify one or more eligible devices connected to the network that are capable of implementing the user-selected parameters and share the private knowledge corpus 137's access credentials with one or more eligible devices of the second device network. In some embodiments of the present disclosure, the portable node may be a transportable device that may be integrated within another device or system. For example, a portable smart device or IoT device. For instance, a computing system such as a mobile communication device, watch, bracelet, remote control, household appliance, furniture or portable product, such as a bag or piece of luggage. The private knowledge corpus 137 built based up the user-selected parameters may be accessible to the second device network permanently, temporarily for a limited amount of time.

In some embodiments, the private knowledge corpus 137 may be available so long as the portable node is connected to the second device network. For example, so long as the portable node is within range of the second device network. Upon expiration of the time limit for accessing the private knowledge corpus 137 or disconnection of the portable node from the second device network, the replaceable variables identified based on the user-selected parameters, which previously replaced the pre-existing values of the second device network's knowledge corpus, may revert to their previous values. Access to the private knowledge corpus 137 may be revoked or made inaccessible to the devices of the second device network, thus reverting the operations and behaviors of the devices of the second device network to their previous state.

Data Processing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1a illustrates a block diagram of a data processing system 10 which may be a simplified example of a computer system capable of performing the computing operations described herein. Data processing system 10 may be representative of the one or more computer systems or devices depicted in the computing environment 100, 160, 300, as shown in FIGS. 1b-4, in accordance with the embodiments of the present disclosure. It should be appreciated that FIG. 1a provides only an illustration of one implementation and does not imply any limitations with regard to the environments in which different embodiments may be implemented. In general, the components illustrated in FIG. 1a may be representative of any electronic device capable of executing machine-readable program instructions.

While FIG. 1a shows one example of a data processing system 10, a data processing system 10 may take many different forms. For example, data processing systems 10 may take the form of personal desktop computer systems, laptops, notebooks, tablets, server systems, client systems, network devices, network terminals, thin clients, thick clients, kiosks, telephone communication devices (e.g., smartphones), multiprocessor systems, microprocessor-based systems, minicomputer systems, mainframe computer systems, smart devices 119, IoT devices 120, sensor devices 122. The data processing systems 10 can operate in a networked computing environment and/or a distributed cloud computing environment, which can include any of the above systems or devices or additional computing devices or systems known or used by a person skilled in the art.

Data processing system 10 may include communications fabric 12, which provides for communications between one or more processor(s) 13, memory 5, persistent storage 16, cache 7, communications unit 11, and one or more input/output (IO) interface(s) 15. Communications fabric 12 can be implemented with any architecture designed for passing data and/or controlling information between processor(s) 13 (such as microprocessors, communications, and network processors, etc.), memory 5, external devices 17, and any other hardware components within a system. For example, communications fabric 12 can be implemented with one or more buses.

Memory 5 and persistent storage 16 may be computer-readable storage media. Embodiments of memory 5 may include random access memory (RAM) and cache 7 memory. In general, memory 5 can include any suitable volatile or non-volatile computer-readable storage media and may comprise firmware or other software programmed into the memory 5. Software applications, program(s) 14 and services, such as the corpus selection program 105, knowledge corpus interface 103, and device network interface 111 described herein, may be stored in memory 5 and/or persistent storage 16 for execution and/or access by one or more of the respective processor(s) 13 of the computer system 10.

Persistent storage 16 may include, for example, a plurality of magnetic hard disk drives. Alternatively, or in addition to magnetic hard disk drives, persistent storage 16 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 16 can also be removable. For example, a removable hard drive can be used for persistent storage 16. Other examples include optical and magnetic disks, thumb drives, and smart cards that are inserted into a drive for transfer onto another computer-readable storage medium that is also part of persistent storage 16.

Communications unit 11 provides for communications with other computer systems or devices via a communications network. In the exemplary embodiment, communications unit 11 may include network adapters or interfaces such as a TCP/IP adapter cards, wireless Wi-Fi interface cards, 3G, 4G, or 5G wireless interface cards or other wired or wireless communication links. Communication networks can comprise, for example, copper wires, optical fibers, wireless transmission, routers, firewalls, switches, gateway computers, edge servers and/or other network hardware which may be part of or connect to nodes of the communications networks devices, systems, host systems, terminals or other network computer systems. Software and data used to practice embodiments of the present invention can be downloaded to each of the computer systems operating in computing or network environment through communications unit 11 (e.g., via the Internet, a local area network or other wide area networks). From communications unit 11, the software and data of program(s) 14 can be loaded onto persistent storage 16.

One or more I/O interfaces 15 may allow for input and output of data with other devices that may be connected to data processing system 10. For example, I/O interface 15 can provide a connection to one or more external devices 17 such as one or more smart devices 119, IoT devices 120, recording devices such as an audio system, camera systems, one or more sensor device(s) 122, input devices such as a keyboard, computer mouse, touch screen, virtual keyboard, touchpad, pointing device, or other human interface devices. External devices 17 can also include portable computer-readable storage media such as, for example, thumb drives, portable optical or magnetic disks, and memory cards. I/O interface 15 may connect to human-readable display 18. Human-readable display 18 provides a mechanism to display data to a user and can be, for example, a computer monitor or screen. Human-readable display 18 can also be an incorporated display and may function as a touch screen, such as a built-in display of a tablet computer.

System for Selectively Sharing Knowledge Corpus Between Device Networks

Referring to the drawings, FIGS. 1b-4 depict an approach that can be executed using one or more data processing systems 10 operating within one or more computing environments 100, 160, 300 to implement selective sharing of a knowledge corpus 129 between AI devices 119, 120, 122, 169, 171, 173. Embodiments of the AI devices 119, 120, 122, 169, 171, 173 may be operating within separate computing environments 100, 161 300 and/or connected to separate device networks 150, 161. The sharing of the knowledge corpus 129 between device networks 150, 161 results in the transfer, replication, cloning and/or adaptation of one or more user-selected parameters such as learned behaviors of a user, settings, capabilities, features, operations or tasks to be executed within another computing environment 100, 160, 300.

Embodiments of computing environments 100, 160, 300 may include a one or more data processing systems 10 interconnected via a device network 150 or a second device network 161. The data processing systems 10 connected to one of the device networks 150, 161 may be specialized systems or devices that may include, but are not limited to, the interconnection of one or more client systems 101, portable nodes 109, one or more sets of smart devices 119, 169, IoT devices 120, 171, sensor devices 122,173 and/or knowledge corpuses 129, 165. The data processing systems 10 exemplified in FIGS. 1b-4 may not only comprise the elements of the systems and devices depicted in the drawings but may further incorporate one or more elements of a data processing system 10 as shown in FIG. 1a and described above. Although not shown in the figures, one or more elements of the data processing system 10 may be integrated into the embodiments of client systems 101, portable nodes 109, sets of smart devices 119, 169 IoT devices 120, 171, sensor devices 122,173 and/or knowledge corpuses 129, 165, including (but not limited to) the integration of one or more processor(s) 13, program(s) 14, memory 5, persistent storage 16, cache 7, communications unit 11, input/output (I/O) interface(s) 15, external device(s) 17 and human-readable display 18.

Embodiments of the client systems 101, portable nodes 109, smart devices 119, 169 IoT devices 120, 171, sensor devices 122,173, knowledge corpuses 129, 165 and other data processing systems 10 may each be placed into communication with one another via a computer network. For example, device network 150 or second device network 161, as exemplified in FIGS. 1b-c. Embodiments of the device networks 150, 161 may be constructed using wired, wireless or fiber-optic connections. Embodiments of the client systems 101, portable nodes 109, smart devices 119, 169 IoT devices 120, 171, sensor devices 122,173, knowledge corpuses 129, 165 and other data processing systems 10, may connect and communicate over the networks 150, 161 via a communications unit 11, such as a network interface controller, network interface card or other network communication device capable of facilitating a connection to one or more networks 150, 161. In some embodiments of the computing environments 100, 160, 300 one or more client systems 101, portable nodes 109, smart devices 119, 169 IoT devices 120, 171, sensor devices 122,173, knowledge corpuses 129, 165 and other data processing systems 10 may represent computer systems utilizing clustered computers and components acting as a single pool of seamless resources when accessed through networks 150, 161. For example, such embodiments can be used in a data center, cloud computing, storage area network (SAN), and network-attached storage (NAS) applications.

Embodiments of the communications unit 11 may implement specialized electronic circuitry allowing for communication using a specific physical layer and a data link layer standard. For example, Ethernet, Fiber channel, Wi-Fi or Token Ring to transmit data between the client systems 101, portable nodes 109, smart devices 119, 169 IoT devices 120, 171, sensor devices 122,173, knowledge corpuses 129, 165 and other data processing systems 10 connected to networks 150, 161. Communications unit 11 may further allow for a full network protocol stack, enabling communication over networks 150, 161 to groups of client systems 101, portable nodes 109, smart devices 119, 169 IoT devices 120, 171, sensor devices 122,173, knowledge corpuses 129, 165 and other data processing systems 10 linked together through communication channels of device networks 150, 161. Device networks 150, 161 may facilitate communication and resource sharing among the client systems 101, portable nodes 109, smart devices 119, 169 IoT devices 120, 171, sensor devices 122,173, knowledge corpuses 129, 165 and other data processing systems 10 (for example, network-accessible storage media) connected to the networks 150, 161. Examples of networks 150, 161 may include a local area network (LAN), home area network (HAN), wide area network (WAN), backbone networks (BBN), peer to peer networks (P2P), campus networks, enterprise networks, the Internet, cloud computing networks and any other network known by a person skilled in the art.

Cloud computing networks are a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 300 is service-oriented with a focus on statelessness, low coupling, modularity, and semantic interoperability. At the heart of cloud computing is an infrastructure that includes a network 150 of interconnected nodes 310.

Figure 3:
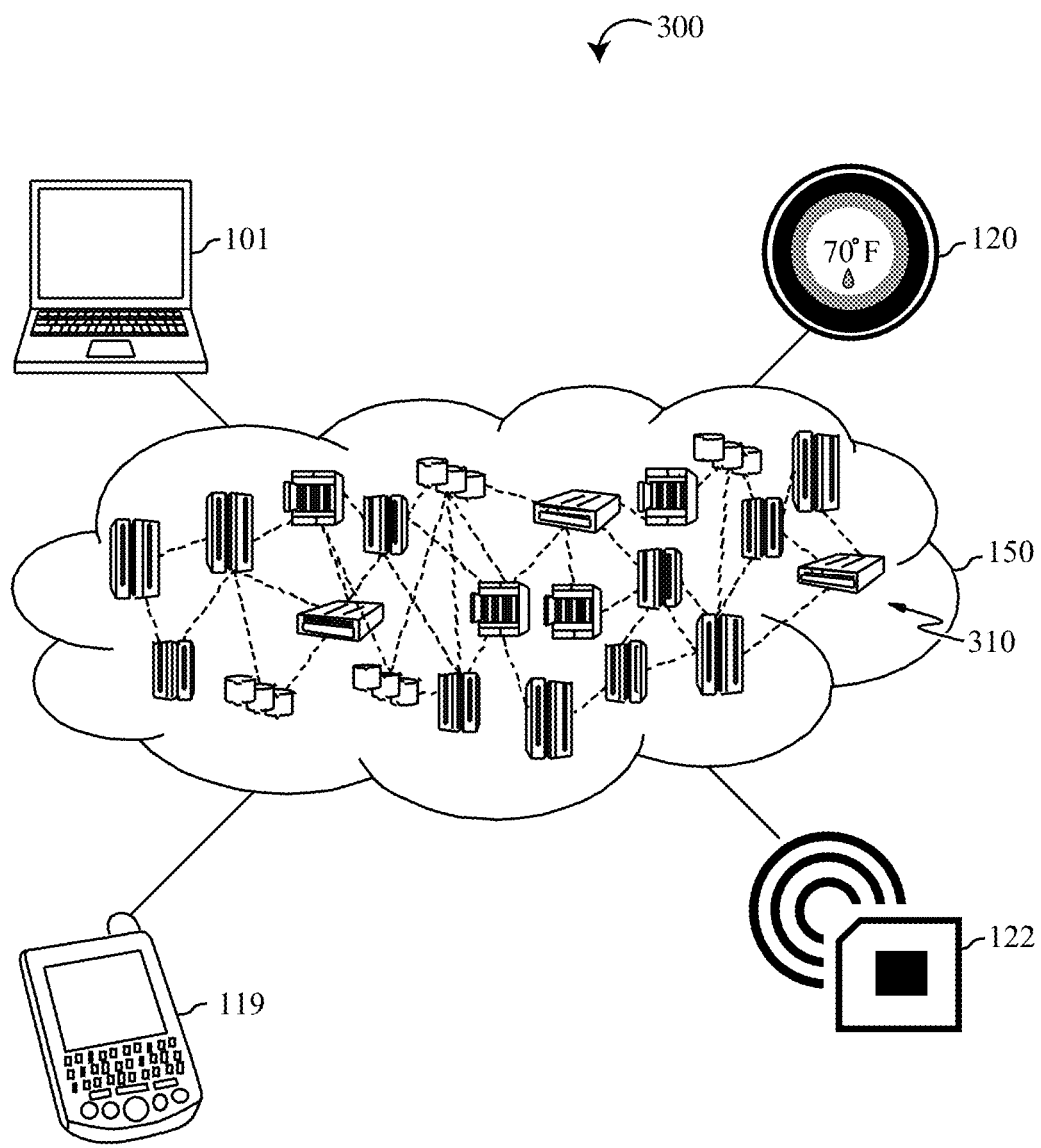
FIG. 3 depicts an embodiment of a cloud computing environment in accordance with the present disclosure.

Referring to the drawings, FIG. 3 is an illustrative example of a cloud computing environment 300. As shown, cloud computing environment 300 includes one or more cloud computing nodes 310 with which client systems 101 operated by the cloud consumers, and A devices 119, 120, 122, 169, 171, 173 may communicate with the cloud computing environment 300. For example, a client system 101, smart device 119, IoT device 120, and sensor device 122. Nodes 310 of the cloud computing environment 300 may communicate with one another and may be grouped (not shown) physically or virtually, in one or more networks, such as Private, Community, Public, or Hybrid clouds as described hereinabove, or a combination thereof. This may allow the cloud computing environment 300 to offer infrastructure, platforms and/or software as services for which a cloud consumer does not need to maintain resources on a client system 101, portable node 109, smart device 119, 169 IoT device 120, 171, sensor device 122,173, knowledge corpus 129, 165 and other data processing systems 10. It is understood that the types of data processing systems 10 connected to the cloud computing environment 300, are intended to be illustrative only and that computing nodes 310 and cloud computing environment 300 can communicate with any type of computerized device over any type of network and/or network addressable connection (e.g., using a web browser).

Figure 4:
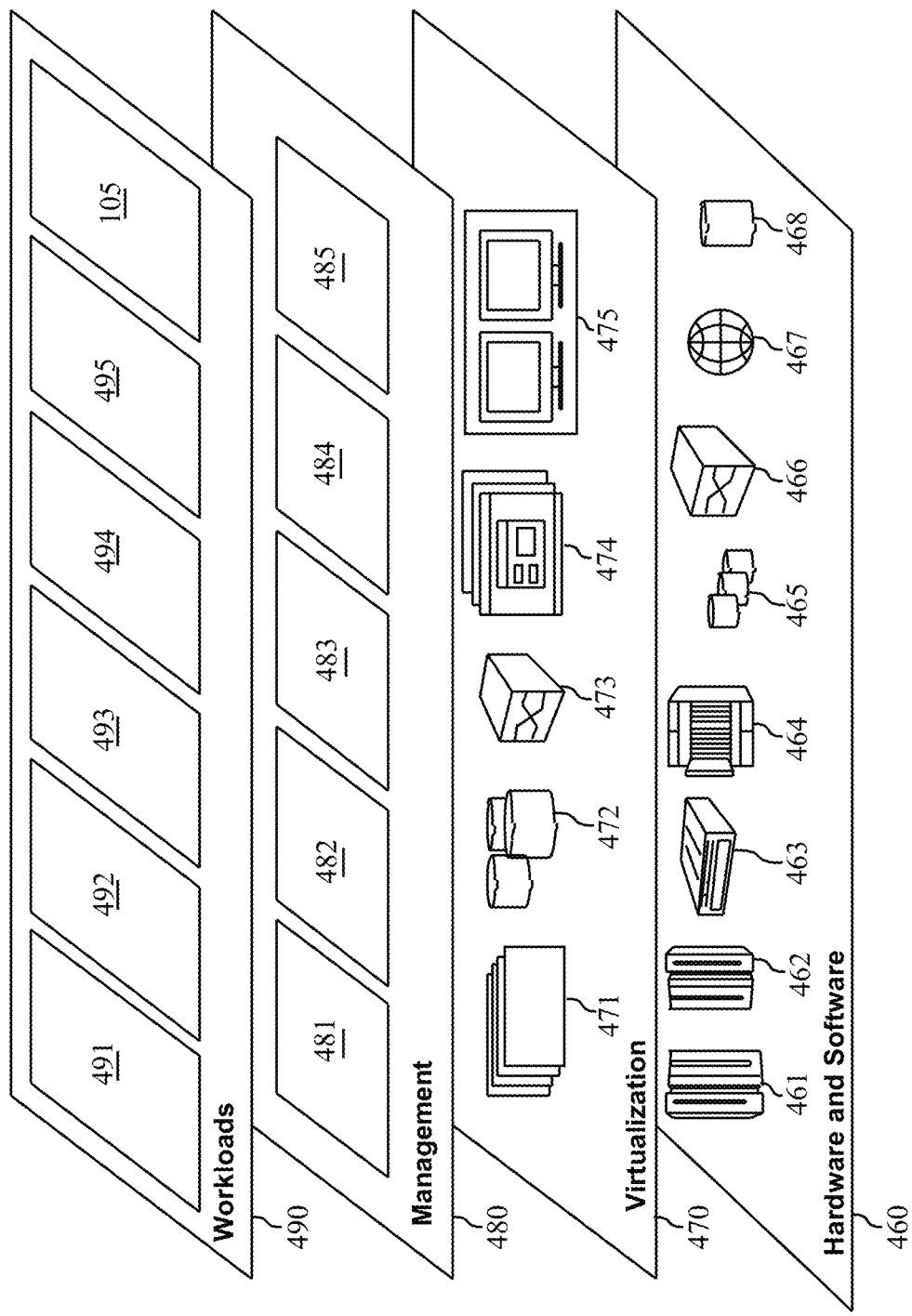
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include mapping and navigation 491, software development and lifecycle management 492, virtual classroom education delivery 493, data analytics processing 494, transaction processing 495, and corpus selection program 105.

Figure 1B:
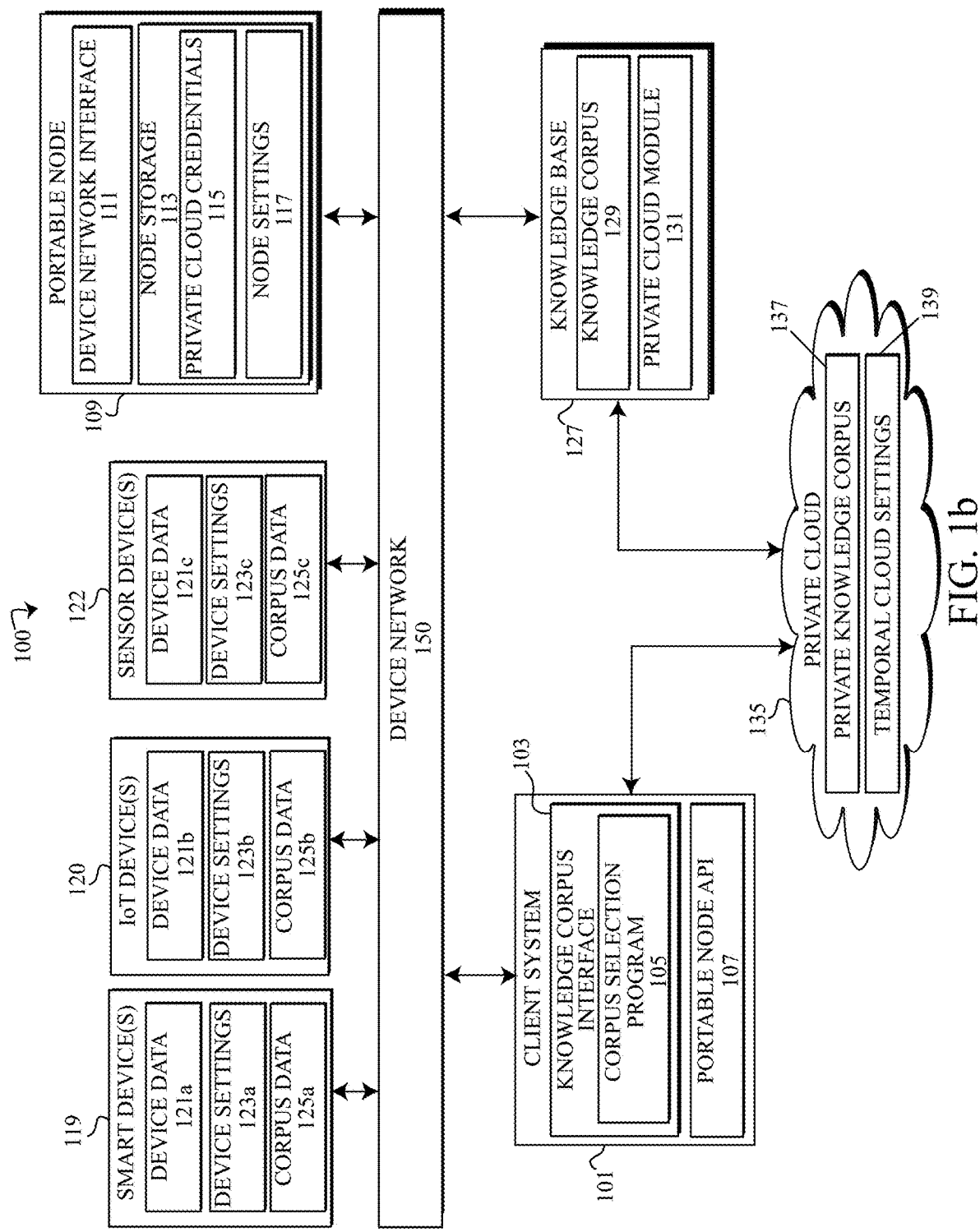
FIG. 1b depicts a functional block diagram describing an embodiment of a computing environment comprising a system for selectively sharing user-selected portions of a knowledge corpus between device networks, in accordance with the present disclosure.
Figure 1C:
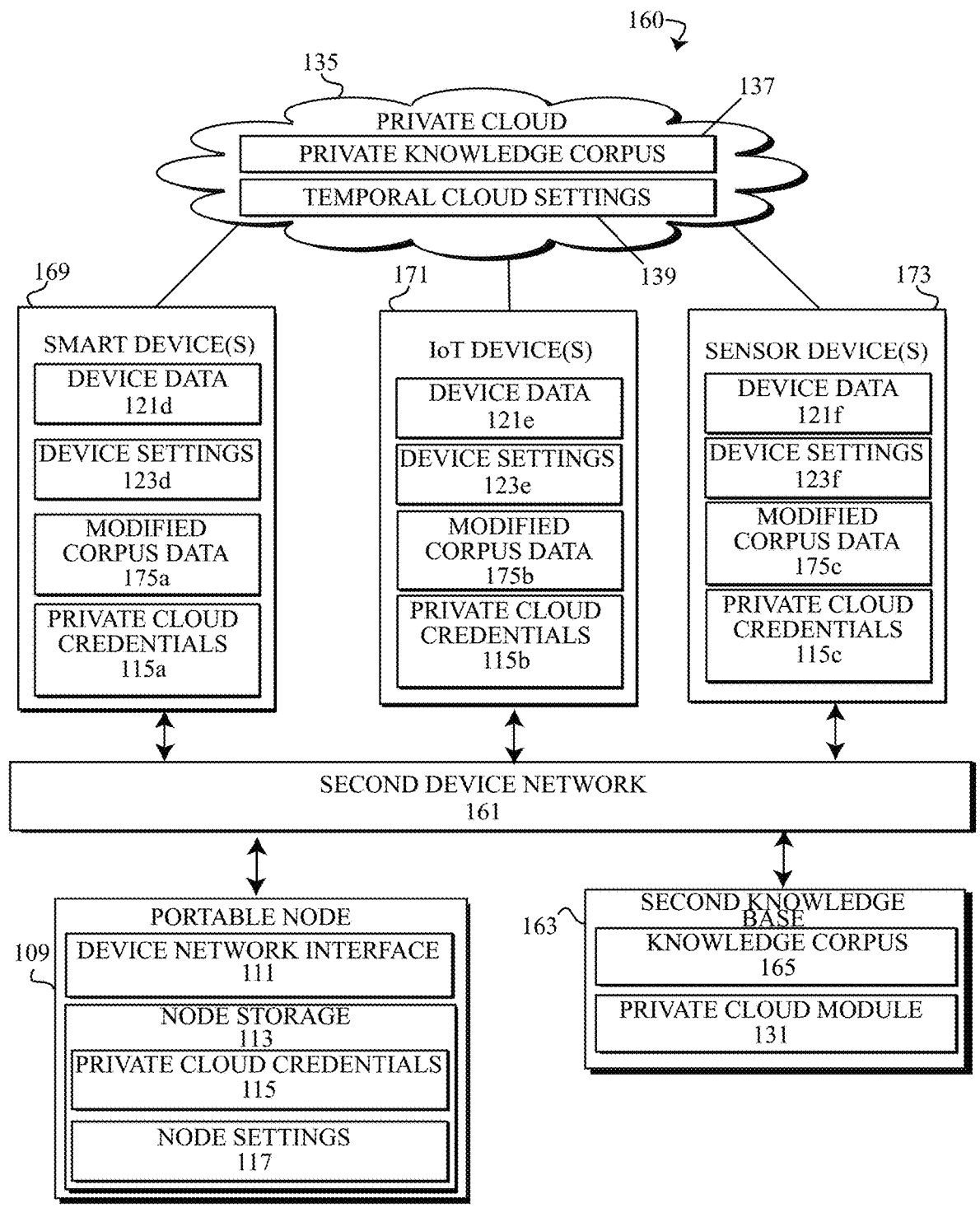
FIG. 1c depicts a functional block diagram describing an embodiment of a computing environment comprising a system receiving selectively shared user-selected portions of a knowledge corpus from a device network of FIG. 1b, in accordance with the present disclosure.

Referring back to the drawings, FIG. 1b-c depict embodiments of computing environments 100, 160 capable of sharing and receiving a shared knowledge corpus implementing one or more user-selected features as described herein. The computing environments 100, 160 feature device networks 150, 161, which may comprise a plurality of specialized data processing systems 10, including a client system 101, a portable node 109, smart device(s) 119, 169, IoT device(s) 120, 171, sensor device(s) 122, 173 and knowledge corpuses 129, 165. Each of the specialized data processing systems 10 of the computing environments 100, 160 depicted may comprise specialized configurations of hardware, software or a combination thereof, as shown and described herein, including specialized modules for implementing one or more particular tasks, functions or operations assigned to the module. The term "module" may refer to a hardware module, software module, or a module may be a combination of hardware and software resources. Embodiments of hardware-based modules may include self-contained components such as chipsets, specialized circuitry, one or more memory 5 devices and/or persistent storage 16. A software-based module may be part of a program 14, program code or linked to program code containing specifically programmed instructions loaded into a memory 5 device or persistent storage 16 device of one of the data processing systems 10 operating as part of the computing environment 100, 160, 300, as exemplified in the drawings of the embodiments described herein.

FIG. 1b is an exemplary diagram depicting a computing environment 100 comprising a device network 150. Embodiments of the device network 150 may connect together and/or place in communication one or more AI devices 119, 120, 122, including a plurality of smart device(s) 119, IoT device(s) 120 and/or sensor device(s) 122. Smart device(s) 119 may refer to computers, electronic devices or systems that are interactive, understand input commands and are able to connect, share and/or interact with other data processing systems 10 while remotely connected to a network. Examples of smart device(s) 119 can include smartphones, tablet computers, smartwatches, smart glasses, and other personal electronics. IoT device(s) 120 may refer to physical objects that are network-enabled with an assigned IP address and/or internet connectivity, enabling the physical object to engage in communication over a computer network with other network-connected devices, including various types of computer systems, devices, and electronics, such as other IoT devices 120. Examples of IoT device(s) 120 can include security systems, thermostats, home appliances, lighting systems, alarm clocks, audio systems/speakers, televisions or other human-readable displays 18, etc. Sensor device(s) 122 may be refer to devices or components that detect or respond to types of input from a physical environment and output a signal that can be converted into a human-readable output at the sensor device's 122 location or may be transmitted electronically over a computer network for reading and/or further processing by another data processing system 10. Examples of the types of input a sensor device 122 may receive could be in the form of light, heat, motion, moisture, pressure, electric potential, acoustic waves, ultrasonic waves, non-visible light (such as infrared) or any other number of environmental phenomena.

Embodiments of AI devices 119, 120, 122 connected to the device network 150 may operate in such a manner that the AI devices 119, 120, 122 may collect device data 121a, 121b, 121c and metadata (referred to generally in a collective as "device data 121"). Embodiments of the collected device data 121 can be transmitted throughout the device network 150 by the A device 119, 120, 122 and/or the device data 121 may be stored by a data repository or data storage device. The device data 121 collected by the AI devices 119, 120, 122 and stored by the device network 150 may be used to the systematically construct the records of a knowledge base 127 by contributing to one or more knowledge corpus 129 which form one or more portions of the knowledge base 127. The collection of the device data 121 used to form the knowledge corpuses 129 may teach each of the AI devices 119, 120, 122 within the device network 150 various cognitive actions or solutions, predict user-specific responses or needs, identify preferred user parameters, learn user-specific behaviors and identify user-preferred settings to implement within the computing environment 100. For example, providing virtual assistant responses or actions based on learned behaviors and actions associated with user's schedule and preferences, etc., such as automatically lifting window blinds, brewing coffee and starting a user's vehicle based on a user's known wakeup and working schedule.

Contributions of the collected device data 121 by the AI devices 119, 120, 122 may improve the cognitive responses by the device network 150 to a user's needs and preferences, receiving user feedback and continuously teaching the AI devices 119, 120, 122 of the device network 150 the preferred device settings 123a-123c (herein "device settings 123"), allowing the device network 150 to learn the appropriate response or to user requests. Moreover, constant device data 121 collection and learning by device network 150 can lead to customization of AI devices 119, 120, 122 as the AI devices 119, 120, 122 learn to perform actions in anticipation of a user request or preference, customizing the overall performance and parameters of the computing environment 100.

As the device network 150 collects device data into the knowledge base 127, portions of the knowledge corpus 129 suitable for specific AI devices 119, 120, 122 to learn or know how to perform particular tasks and/or enable specific device capabilities may be loaded or streamed over the device network 150 to the A devices 119, 120, 122 as corpus data 125a-125c (referred to generally as "corpus data 125"). Embodiments of the corpus data 125 may influence, modify or enable selection of one or more device settings 123 of the AI devices 119, 120, 122 based on the values of the corpus data 125. The values of the corpus data 125 accessed by the A devices 119, 120, 122 may teach the AI devices 119, 120, 122 to perform one or more actions or learned behaviors.

Embodiments of the knowledge base 127 may be a human-readable and/or machine-readable resource for disseminating and optimizing information collection, organization and retrieval for a computing environment 100 and more specifically, one or more device networks 150, 161. The knowledge base 127 may draw upon the knowledge of humans and artificial intelligence, that has been inputted into the knowledge base 127 in a machine-readable form. For example, inputs from AI devices 119, 120, 122 in the form of collected device data 121, such as sensor data, location data, behavioral data, audio data, image data, etc. Embodiments of the knowledge base 127 may be structured as a database. Embodiments of the knowledge base 127 may be used to find solutions to current and future problems by using the device data 121 collected by the AI devices 119, 120, 122 inputted into the knowledge base 127 in order to automate the decisions, responses and actions performed by the AI devices 119, 120, 122 connected to the device network 150.

Embodiments of the knowledge base 127 may not be simply a static collection of information. Rather, the knowledge base 127 may be a dynamic resource having the cognitive capacity for self-learning, using one or more data modeling techniques and/or by working in conjunction with one or more machine learning programs to improve AI device 119, 120, 122 automation, functions and capabilities within device network 150. Embodiments of the knowledge base 127 may apply problem-solving logic and use one or more problem-solving methods to provide a justification for conclusions reached by the knowledge base 127 when implementing one or more parameter, automated action or device setting 123 within the computing environment 100.

Exemplary embodiments of knowledge base 127 may be a machine-readable knowledge base 127 that may receive, and store device data 121 collected by each AI device 119, 120, 122 and inputted into the knowledge base 127, along with any user feedback, or manually entered user adjustments, settings or parameters which may be stored as part of one or more knowledge corpus 129. A knowledge corpus 129 may refer collections and/or the fragments of knowledge inputted into the knowledge base 127. Embodiments of the knowledge corpuses 129 can be independent and uncoordinated from one another, whereas the knowledge base 127 compiling all of the knowledge corpuses 129, may have an intentional ontological design for organizing, storing, retrieving and recalling the collection of knowledge provided by each knowledge corpus 129. The historical compilation of collected device data 121 and user feedback can be applied to making future predictions about AI device automation and selecting device settings 123 to be applied. Embodiments of the knowledge base 127 may perform automated deductive reasoning, machine learning or a combination of processes thereof to configure the device settings 123, automated actions or learned behaviors implemented by one or more AI devices 119, 120, 122 within the device network 150 and/or computing environment 100, which may be dependent on the features and capabilities of each AI device 119, 120, 122.

Embodiments of a knowledge base 127 may comprise a plurality of components to operate and make decisions directed toward automating device settings 123, parameters and performance of AI devices 119, 120, 122 present within the device network 150. Embodiments of the knowledge base 127 may include components (not shown) such as a facts database, rules engine, a reasoning engine, a justification mechanism, and a knowledge acquisition mechanism. The facts database may contain the knowledge base's 129 current fact pattern of a particular situation, which may comprise data describing a set of observations based on device data 121 collected by the AI devices 119, 120, 122 and/or user input or feedback.

Embodiments of the rules engine of knowledge base 127 may be a set of universally applicable rules that may be created based on the experience and knowledge of the practices of experts, developers, programmers and/or contributors to knowledge corpuses 129 of the knowledge base 127. The rules created by the rules engine may be generally articulated in the form of if-then statements or in a format that may be converted to an if-then statement. The rules of knowledge base 127 may be fixed in such a manner that the rules may be relevant to all or nearly all situations covered by the knowledge base 127. While not all rules may be applicable to every situation being analyzed by the knowledge base 127, where a rule is applicable, the rule may be universally applicable.

Embodiments of the reasoning engine of knowledge base 127 may provide a machine-based line of reasoning for solving problems, such as deciding which device settings 123 or learned responses to a user action and may provide the best solution for automating a device network 150, or predictively meeting the needs of a user who is utilizing the device network 150. The reasoning engine may process the facts in the fact database and the rules of the knowledge base 127. In some embodiments of the knowledge base 127, the reasoning engine may also include an inference engine which may take existing information stored by the knowledge base 127 and the fact database, then use both sets of information to reach one or more conclusions and/or implement an action. Embodiments of the inference engine may derive new facts from the existing facts of the facts database using rules and principles of logic.

Embodiments of the justification mechanism of the knowledge base 127 may explain and/or justify how a conclusion by knowledge base 127 was reached. The justification mechanism may describe the facts and rules that were used to reach the conclusion. Embodiments of the justification mechanism may be the result of processing the facts of a current situation in accordance with the record entries of the knowledge base 127, the reasoning engine, the rules and the inferences drawn by the knowledge base 127. The knowledge acquisition mechanism of the knowledge base 127 may be performed by manual creation of the rules, a machine-based process for generating rules or a combination thereof.

In some embodiments, the knowledge base 127 may include an analytics engine which may apply one or more machine learning techniques, either in conjunction with or as part of the knowledge base 127, to arrive at one or more device settings 123, learned behaviors, responses, or actions based on the collected device data 121. Machine learning may refer to a method of data analysis that may automate analytical model building, allowing for data processing systems 10 of the device network 150 to learn from the collected device data 121 inputted and analyzed by the analytics engine, including past instances of historical data processing of one or more data sets collected by the AI devices 119, 120, 122 of the device network 150, in order to justify patterns and make decisions about future AI device 119, 120, 122 activity, responses and device settings 123. Embodiments of the analytics engine of knowledge base 127 may utilize supervised, unsupervised or semi-supervised techniques to automate AI device 119, 120, 122 performance within the device network 150 or the computing environment 100.

Embodiments of the computing environment 100 may comprise a client system 101 that may orchestrate a user's selection of user-selected parameters to copy, transfer, recreate and/or clone from the device network 150 to a second device network 161. The sharing of the user-selected parameters between device network 150 and the second device network 161 may be performed by sharing one or more nodes of knowledge corpus 129 associated with the user-selected parameters. In some embodiments, the client system 101 and portable node 109 (described below) may be integrated into a single systems that may act as both the client system 101 orchestrating the selection of user-selected parameters and the portable node 109 sharing access to the private cloud 135 hosting selected portion(s) of the knowledge corpus 129. In other embodiments, the client system 101 may be a distinct or separate system or device from the portable node 109.

Embodiments of the client system 101 may be a type of data processing system 10 that may perform functions or tasks associated with managing the selection of one or more user-selected parameters, creation of the private cloud corpus hosted by private cloud 135 and designate which portable node(s) 109 of the device network 150 will receive private cloud credentials 115 for sharing user-selected parameters with one or more AI devices 169, 171, 173 of a second device network 161. Communication between the client system 101 and the portable node 109 may be performed using a portable node API 107. Embodiments of the client system 101 may comprise a knowledge corpus interface 103 for interacting with the knowledge base 127 and for inputting one or more selections of user-selected parameters stored by one or more knowledge corpuses 129 of the knowledge base 127 using a corpus selection program 105.

Figure 2:
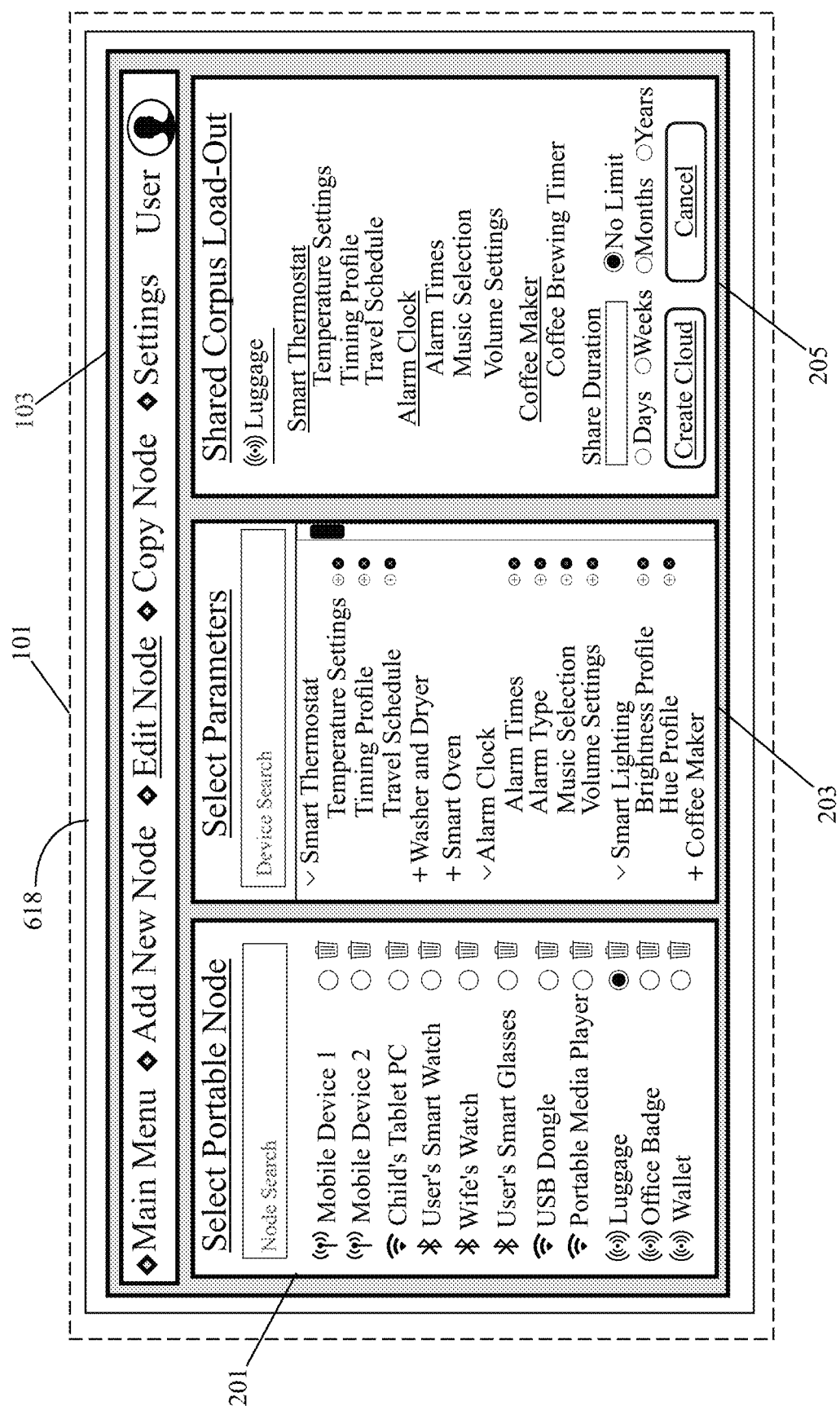
FIG. 2 depicts an embodiment of a knowledge corpus interface for selecting and sharing user-selected portions of a knowledge corpus between one or more device networks, in accordance with the present disclosure.

FIG. 2 depicts an exemplary embodiment of a knowledge corpus interface 103 which may be running a corpus selection program 105, as shown and described herein. The knowledge corpus interface 103 may be a graphical user interface (GUI) such as the one depicted in FIG. 2. The GUI may graphically present to the user operating the client system 101, a plurality of choices that may allow a user to create or add new portable nodes 109 to an existing device network 150, edit existing portable nodes 109 of a device network and/or copy a previously customized configuration of a portable node 109 to another portable node 109. A portable node 109 may refer to any portable data processing system 10, and more specifically a computing device or computer system that may function as a node of first device network 150 and may be customized and/or equipped with private cloud credentials 115 that may be shared with one or more AI devices 169, 171, 173 of a second device network 161, allowing the AI devices 169, 171, 173 to access a private cloud 135.

In some embodiments of the corpus selection program 105, the user may use the knowledge corpus interface 103 to create a new portable node 109. In some embodiments, any suitable portable computing device or computer system may be connected to the device network 150 and customized or configured as a portable node 109. For example, by connecting one or more AI devices 119, 120, 122 to the device network 150, the AI devices 119, 120, 122 may be recognized as suitable portable nodes 109 and made selectable for customization or configuration as a portable node 109. In some embodiments, computing devices, computing systems or other data processing systems 10 are potential candidates for configuration as a portable node 109 may be configured with additional software or firmware for implementing the tasks or functions of the portable node 109 described herein. For example, newly created portable nodes 109 may be assigned a device ID name on the device network 150 and configured with a device network interface 111 that may allow the portable node 109 to identify AI devices 119, 120, 122, 169, 171, 173 connected to device networks 150, 161, as well as communicate and share private cloud credentials 115 with AI devices 119, 120, 122, 169, 171, 173 capable of implementing user-selected parameters.

The exemplary embodiment of FIG. 2 depicts a knowledge corpus interface 103 running a corpus selection program 105 operating in a mode for editing existing portable nodes 109. As shown in FIG. 2, existing portable nodes 109 of a device network 150 may be edited and configured by selecting and customizing user-selected parameters that the user desires to recreate or clone (either temporarily or permanently) within a second device network 161. As shown in the exemplary embodiment of FIG. 2, the knowledge corpus interface 103 may comprise portions 201, 203, 205 of the interface that may allow for the user to select a portable node 109 to configure, a list of available user-selected parameters associated with the AI devices 119, 120, 122 of the device network 150 and knowledge base 127, and a customized load-out summary for selected portable node(s) 109, describing the AI devices 119, 120, 122 associated with the user-selected parameters. The knowledge corpus interface 103 may also include a section for configuring one or more settings. For example, configuration settings adjusting a duration of time to implement the private cloud corpus (temporal cloud settings) and assigning the private cloud 135 that will be hosting the private cloud corpus.

Referring to portion 201, a section of the knowledge corpus interface 103 is shown displaying a list of one or more portable nodes 109 that may be connected to the device network 150 and accessible to the client system 101. As shown in the example of FIG. 2, many different types of devices or systems may function as a portable node 109, including one or more AI devices 119, 120, 122. For example, mobile computing devices, tablet computers, smartwatches, smart glasses, USB devices, portable media players, and IoT devices 120 such as smart luggage, badges, wallets, etc. Embodiments of the portable nodes 109 may communicate using various electronic communication methods known by those skilled in the art, including both wired and wireless communication technologies. The type of communication a portable node 109 may employ can be identified to the user as part of the GUI, allowing for a user to select a communication type suitable for and/or anticipated to be suitable for the second device network 161, that the user might intend to share the private knowledge corpus 137 with. For example, as shown in portion 201, each portable node 109 is identified by a symbol describing the portable node's communication type next to the device ID naming the portable node 109. For instance, "mobile device 1" is identified as communicating via cellular communications, whereas "user's smart glasses" communicate using Bluetooth, "USB dongle" communicates over Wi-Fi and "luggage" communicates by broadcasting a radio signal such as near field communication (NFC) or RFID.

From portion 201 of the knowledge corpus interface 103, a user may select one or more portable nodes 109 to configure from a list of available portable nodes 109 connected to the device network 150. For example, making a selection by clicking the portable node 109 desired to be configured or by clicking a selection indicator such as a radio button or other means of indicating a selection. Users may choose to recreate the behavior and settings of their entire device network 150 by selecting every available user-selected parameter in some embodiments. In other embodiments, users may select and recreate only a subsection of parameters maintained by an existing device network 150 or computing environment 100 by selecting a portion of the user-selectable parameters, rather than selecting every available user-selectable parameter. Allowing for targeted customization and portability of desired features, parameters and learned behaviors, without having to clone the entire set of user-selected parameters to a second device network 161.

As shown by portion 203 of the knowledge corpus interface 103, a user may proceed to customize the user-selected parameters from a list of AI devices 119, 120, 122 and associated parameters, settings, learned behaviors, device capabilities, features, etc. that may be associated with each AI device 119, 120, 122 listed. As shown in FIG. 2, users may navigate amongst listed AI devices 119, 120, 122 and selectively pick and choose multiple user-selected parameters to add to the private knowledge corpus 137. In some embodiments, users may also delete user-selected parameters that may have been previously selected, allowing for further customization by the user. Users may mix and match the user-selected parameters from the available list and as the user makes one or more selections, the user's selections may appear in portion 205 of the knowledge corpus interface 103 in real-time or near real-time. For example, a user is scheduled to travel to a hotel on a business trip and the hotel includes an A computing environment within the user's room, which is equipped with a second device network 161. A user decides to replicate one or more features of the user's existing device network 150 from his home within the second device network 161 of the hotel room. In anticipation of traveling to the hotel, the user configures a portable node 109, such as the user's luggage that will be brought on the trip from a client system 101. To recreate the user's home environment, the user selects parameters from a home thermostat, such as temperature settings, a timing profile to control when settings increase or decrease during the day, alarm clock settings to control the time, volume, type of alarm, default music selection, etc. and even smart lighting settings as shown, including a brightness profile that controls the time of day that lights turn on or off and their intensity. When the user travels to the hotel room, the user-selected parameters can be applied to the hotel room's device network, resulting in the device network of the hotel room recreating the same thermostat settings, alarm clock settings and lighting settings using the selected parameters selected by the user.

In some embodiments, the user-selected parameters may include a selection of device capabilities that may be natively available to the AI devices 119, 120, 122 connected to the user's device network 150, but may not be natively available to one or more A devices 169, 171, 173 of a second device network 161 where the user will be simulating or recreating device network 150. Embodiments of the present disclosure may allow for device capabilities or features that are enabled on an AI device 119, 120, 122 of device network 150, to be selectively enabled within a second device network 161 on an AI device 169, 171, 173 as a benefit of sharing a knowledge corpus 129. A user may be able to select one or more device features or capabilities natively available to a user's AI devices 119, 120, 122 via the knowledge corpus interface 103. As part of the recreation or cloning of the user's device network 150 within the second device network 161, device capabilities that might not natively be available to AI devices 169, 171, 173 may be temporarily enabled while sharing the private knowledge corpus 137 with the second device network 161. For example, two different smart devices, smart device 119 and smart device 169 may be different types of models or even competing models of a product. Smart device 119 may be a higher-end device with additional capabilities that are natively available at the time of purchase or purchased as an add-on capability. Smart device 169 may not natively include access to higher-end or add-on features, but the features may be enabled through the device's software or firmware. Accordingly, by sharing the private knowledge corpus 137, which includes user-selected parameters directed toward device capabilities not normally enabled on smart device 169, smart device 169 may be enabled to perform the selected device capabilities temporarily while the private knowledge corpus 137 is accessible to smart device 169.

For example, smart device 119 and smart device 169 can be a virtual assistant loaded into an AI hub. Smart device 119 may include particular voice or language pack that is configured to be used within a user's home device network, but the same voice or language pack is natively not available on smart device 169 without an additional purchase. Accordingly, when the user selects the voice and/or language pack from portion 203 during the configuration of the portable node 109 and the private knowledge corpus 137, upon connection to the private knowledge corpus 137 by smart device 169, smart device 169 may be enabled to use the particular voice and language pack selected by the user (through a software update, firmware setting or other configuration) while the smart device 169 has access to the private knowledge corpus 137. Thus, recreating and/or cloning the user's experience using the virtual assistant of the AI hub device on smart device 119 and smart device 169, despite different device capabilities being natively available on the smart device 169.

In some embodiments of the knowledge corpus interface 103, a user may describe the type of experience or environmental behavior that the user wants to be transferred or cloned to a second device network 161. In response to the user's description of a described environmental experience, the knowledge corpus interface 103 may provide recommendations for user-selectable parameters that a user may select in order to obtain the desired environment within the second device network 161. For example, a user may desire a second device network 161 within a surrounding environment to set the overhead lights to a specific color hue with a specific level of warmth to the color being projected (i.e. $3000k$). In response to the user's request, the knowledge corpus interface 103 may highlight or recommend selecting one or more user-selectable parameters from the smart lighting tab, including a recommended brightness profile and hue profile to share with the second device network 161.

As shown in the exemplary embodiment of FIG. 2, portion 205 of the knowledge corpus interface 103 may include a section reporting a shared corpus load-out for each portable node 109 being configured or customized by the user during a particular configuration session. For example, as shown in FIG. 2, a shared corpus load-out describes the user-selected parameters being added to a private knowledge corpus 137. In some embodiments of the knowledge corpus interface 103, the user may further configure a share duration for the portable node 109 to actively share the private cloud credentials 115 and/or configure an amount of time that the private knowledge corpus 137 will be actively hosted on private cloud 135. As shown in the exemplary embodiment, a user may enter a duration that may be permanent (i.e. no limit to the duration), or the private cloud 135 may host the private knowledge corpus 137 for a user-selected time limit that may span days, weeks, months or even years.

Embodiments of the knowledge corpus interface 103 may further allow a user to configure one or more node settings 117 for each portable node 109 being configured by the user. The node settings 117 may be stored to node storage 113 of the portable node 109. In some embodiments, a user configuring a portable node 109 may select or apply additional node settings 117, including but not limited to selecting or inputting a particular network ID, network name or access credentials for the second device network 161, that may allow for the portable node 109 to connect thereto. In some embodiments, the node settings 117 configured by the user may point the portable node 109 to connect to a second device network 161 based on specified geolocation rather than a network id. For example, using GPS location data, Wi-Fi positioning, or other methods to describe the location wherein the portable node should search for a second device network 161. When the portable node 109 is positioned within the designated geolocation, portable node 109 may search and connect to a nearby network. In other embodiments, the user may establish other types of node settings 117 that designate specific AI devices 169, 171, 173 the portable node 109 is instructed to the share private cloud credentials 115 with. For example, the node settings 117 configured by the user may include specific identification of AI devices 169, 171, 173 by a specific device id, IP address, MAC address or other identifying characteristics.

As shown by portion 205 of the FIG. 2, upon completion of the portable node 109 configurations by the user, the user may execute the activation or creation of the private knowledge corpus 137 on the private cloud 135 by signaling the completion of the configuration and selection of user-selected parameters. For example, by clicking the "create cloud" button depicted in FIG. 2, or any other known method. During the implementation of the private knowledge corpus 137, the private cloud module 131 may perform tasks and operations associated with the creation and or activation of the private knowledge corpus 137, and the generation of the private cloud credentials 115 for accessing the private cloud 135. Private cloud credentials 115 may be shared with portable node 109 configured by the corpus selection program 105. In some embodiments, the private cloud credentials 115 may be delivered to the portable node 109 by the private cloud module 131 during the creation of the private knowledge corpus 137. In other embodiments, client system 101 may interface with the portable node 109 via the portable node API 107 and upload the private cloud credentials 115 to the node storage 113, accessible to the portable node 109.

Based on the selection of the user-selected parameters, embodiments of the private cloud module 131 may build the private knowledge corpus 137 using the knowledge corpuses 129 of the knowledge base 127 to create a subset of the knowledge base 127 uploaded, copied and/or transferred to the private cloud 135. Additionally, temporal cloud settings 139 may be created, designating an amount of time that the private cloud 135 may host the private knowledge corpus 137 or be accessible by AI devices 169, 171, 173 equipped with private cloud credentials 115 shared by portable node 109.

Embodiments of the private cloud module 131 may analyze the user-selected parameters and identify content stored by the knowledge base 127, including nodes of one or more knowledge corpus 129, that should be copied, cloned, shared or transferred to the private knowledge corpus 137. Embodiments of the private cloud module 131, analyzing the content stored by the knowledge base 127, may identify one or one or more replaceable variables within the knowledge corpus 129 that can be changed, replaced or substituted within the new computing environment 160, in order to achieve the selected function or operation of the user-selected parameters, upon sharing the private knowledge corpus 137 with one or more AI devices 169, 171, 173 of the second device network 161. The values of the replaceable variables within private knowledge corpus 137 may vary depending on who may be present and/or expected by the private cloud module 131 to be interacting with the second device network 161. For example, the private knowledge corpus 137 being shared to a second device network 161 may be expected to be used by the current user configuring the private knowledge corpus 137. Accordingly, the private knowledge corpus 137 may be created with replacement values for the replaceable variables based on the usage patterns of the user configuring the private knowledge corpus 137. However, in other instances, the user of the second device network 161 may not be the same user as the user configuring the private knowledge corpus 137. Under such conditions, the private cloud module 131 may determine that the second user may be expected to use the second device network 161 instead of the configuring user. Instead of inserting replacement values for the replacement variables that would be suitable for known preferences of the configuring user, replacement values may be substituted for the replaceable variables identified in the private knowledge corpus 137 that may reflect the second user's preferences or known usage patterns.

For example, the configuring user is sharing the configuring user's selected parameters during initial setup for a second device network 161 owned or operated by a second user. The sharing of the user-selected parameters can to truncate or limit the amount a time that may be needed to set up the second device network 161 that will be used by the second user. The user can use the configuring user's current settings, features, capabilities or other user-selected parameters instead of the second user having to configure the second device network 161 from scratch. The truncated setup may be modified based on the second user's profile information or other device data 121*d*-121*f* collected and stored by the second device network 161. Thus, combining user-selected parameters provided by the configuring user with the user-specific preferences of the second user. For instance, as part of the configuration of the second device network 161, one of the IoT devices 171 can be automated window shades that can be remotely rolled up and down depending on user preferences and settings. As part of the initial configuration, the configuring user selects parameters from the first device network 150 which instruct the automated window shades to roll up at the start of the user's day and roll down at the end of the day. However, instead of the configuring user selecting parameters that include the configuring user's wake up and sleep times, preferences provided by the second user can customize the user-selected parameters provided by the configuring user. Therefore, while both users have applied the same parameters for rolling up and down the window shades automatically, the times in which the programmed action occurs can be based on user-dependent preferences which were not shared between the device networks 150, 161. Thus, allowing a mixture of shared user-selected parameters and user-specific parameters tied to the user of the second device network 161 (or anticipated user thereof).

In another example, a configuring user may be a business that sells AI devices 169, 171, 173 and may license particular capabilities, features. The configuring user may charge a fee to set up AI devices or activate the particular capabilities or features within the second device network 161. When the second user buys or subscribes to the configuring user's product or service, the configuring user may be able to activate the private knowledge corpus 137 and set up the second device network 161 from an existing set of default parameters. The activation of the features, capabilities, and settings on the second device network 161 may persist for as long as the user is licensed or subscribed to the provider's product or service. Accordingly, once the subscribing user cancels the services, ceases to pay for them or license expires, access to the private knowledge corpus 137 can be revoked by the service provider, thus preventing the AI devices 169, 171, 173 from being able to access the capabilities, settings, and features previously enabled.

In some embodiments, the private cloud module 131 can build the private knowledge corpus 137 based on individually selected capabilities or other user-selected parameters that the configuring user has selected to share with the second device network 161. Based on the user-selected parameters, the private cloud module 131 can identify data, such as the replacement values that may be shared or any modifications to the replacement values that may be performed to implement the user-selected parameters, based on the available AI devices 169, 171, 173, network connections and capabilities of the AI devices 169, 171, 173. In some instances, not all user-selected parameters may be able to be shared with second device network or accessed through the private knowledge corpus 137, because of the limitations or lack of capabilities of the AI devices 169, 171, 173. In some embodiments, the private cloud module 131 may anticipate the limitations of the second device network 161 when building the private knowledge corpus 137 and alert the user of the limitations and/or suggest a modification to the user-selected parameters. As discussed above, in some embodiments new capabilities may be added to existing AI devices 169, 171, 173 where such capability may not have been available natively otherwise. For example, in some embodiments, the capabilities identified by the user may already be linked to datasets that would enable the new capability to be implemented on AI devices 169, 171, 173. When the private knowledge corpus 137 is built by the private cloud module 131, the identified datasets associated with the new capability selected by the user can be copied to the private knowledge corpus 137. Accordingly, when AI devices 169, 171, 173 access the private knowledge corpus 137, the AI devices will access the dataset that was copied, thus enabling the capability on the AI devices 169, 171, 173 while the private knowledge corpus 137 is accessible or unexpired.

In some embodiments, the private cloud module 131, may build the private knowledge corpus 137 on the private cloud 135 based on the types of AI devices 169, 171, 173 that may be known to exist within the second device network 161 and/or user profiles may be available to the private cloud module 131. Embodiments of the private cloud module 131 may analyze the usage of the known AI devices 169, 171, 173 of the second device network 161 and based upon the known AI devices 169, 171, 173 of the second device network 161, the private cloud module can derive user preferences within the computing environment 160 of the second device network 161 and customize the private knowledge corpus 137 to the expected usage of the known AI devices 169, 171, 173. Moreover, in some instances, the private cloud module 131 may analyze user interest profiles and derive likely patterns of expected usage for each expected user of the second device network 161 and customize the private knowledge corpus 137 in accordance with the expected usage patterns of the second device network 161 users.

Referring to the drawings, FIG. 1c depicts a second device network 161 receiving a portable node 109 configured by the knowledge corpus interface 103 and is ready to share private cloud credentials 115 with the AI devices 169, 171, 173 of the second device network 161. Upon connecting to the second device network 161, embodiments of the portable node 109 may be programmed to scan the second device network 161 for one or more A devices 169, 171, 173 that may be eligible to be modified based on the user-selected parameters being shared. Embodiments of the portable node 109 may include a device network interface 111 which may identify each of the AI devices 169, 171, 173 connected to the second device network 161. For example, by device ID, serial number, model number or other accessible data or metadata that may be identifiable over the second device network 161. In some embodiments, the portable node 109 may be able to query a database or other repository for additional information about the AI devices 169, 171, 173 identified and determine the features and capabilities each A device 169, 171, 173 may be able to access. Based on the identification of the AI devices 169, 171, 173, the portable node 109 may further determine which of the identified AI devices 169, 171, 173 should receive a copy of the private cloud credentials 115 (copies shown in FIG. 1c as private cloud credentials 115a, 115b, 115c).

Embodiments of AI devices 169, 171, 173 receiving a copy of the private cloud credentials 115 may store the private cloud credentials 115 and use said private cloud credentials 115 to access the private cloud 135 hosting the private knowledge corpus 137. AI devices 169, 171, 173 receiving the private cloud credentials 115 may connect to an active private cloud 135 comprising a private knowledge corpus 137 and access an unexpired private knowledge corpus 137, in accordance with the private cloud credentials 115 provided to the AI device 169, 171, 173. In some embodiments, the AI device 169, 171, 173 may download data from the private knowledge corpus, including one or more replacement values that can be applied to the corpus data stored by the AI device 169, 171, 173. In alternative embodiments, the private cloud 135 may upload data stored by the private knowledge corpus 137 to the AI device 169, 171, 173 connected to the private knowledge corpus 137. Embodiments of the corpus data received by the AI device 169, 171, 173 may modify existing corpus data 125 that may already be stored by the AI device 169, 171, 173. The modified corpus data 175a, 175b, 175c (referred to generally as "modified corpus data 175") may be a combination of corpus data 125 obtained from the second knowledge base 163 comprising one or more knowledge corpus 165 and one or more replacement values substituted for replacement variables identified to be associated with the user-selected parameters. Moreover, in embodiments where new capabilities and features are enabled on the AI device 169, 171, 173, additional datasets corresponding to the capabilities or features may be added to the modified corpus data 175 stored by the AI device 169, 171, 173.

Furthermore, device settings 123d-123f may be added, modified or adjusted for the AI device 169, 171, 173 based upon the modified corpus data 175. For example, IoT device 171 can be a virtualized AI assistant that a user can talk to, ask questions and make requests for different types of data. Prior to incorporating the modified corpus data 175, the virtualized A assistant speaks in a voice selected by the previous user to make the selection, whereas upon modifying the corpus data 125 to modified corpus data 175, the user-selected parameter of the private knowledge corpus 137 included a replacement value indicating preference for the device settings 123 to set the virtualized AI assistance's voice to a different voice than previously set. Accordingly, when the corpus data 125 is modified to modified corpus data 175 at A device 169, 171, 173, the device settings 123d-123f are adjusted in response to the newly modified corpus data 175 and the replacement values associated with the voice selection setting.

Embodiments of the AI devices 169, 171, 173 may actively maintain the modified corpus data 175, the accompanying device settings 123d-123f and new capabilities or features unlocked by the modified corpus data 175, while the private knowledge corpus 137 remains active and/or continues to be hosted by the private cloud 135. The temporal cloud settings 139 may regulate the expiration date and time the private knowledge corpus 137 remains active, the length of time the private cloud 135 hosts the private knowledge corpus 137, and/or the length of time the private cloud credentials 115 will remain active. Upon the expiration of the private knowledge corpus 137 and/or the private cloud credentials 115, the AI device 169, 171, 173 that comprise active private cloud credentials 115 may be disconnected from the private cloud 135, release access to the private knowledge corpus 137, revert the modified corpus data 175 back to the previously accessible corpus data active prior to the modification of the corpus data 125 and/or revert device settings 123d-123f back to a previous state prior to implementing the modified corpus data 175 utilizing the user-selected parameters.

Method for Selectively Sharing Knowledge Corpus Between Device Networks

Figure 5A:
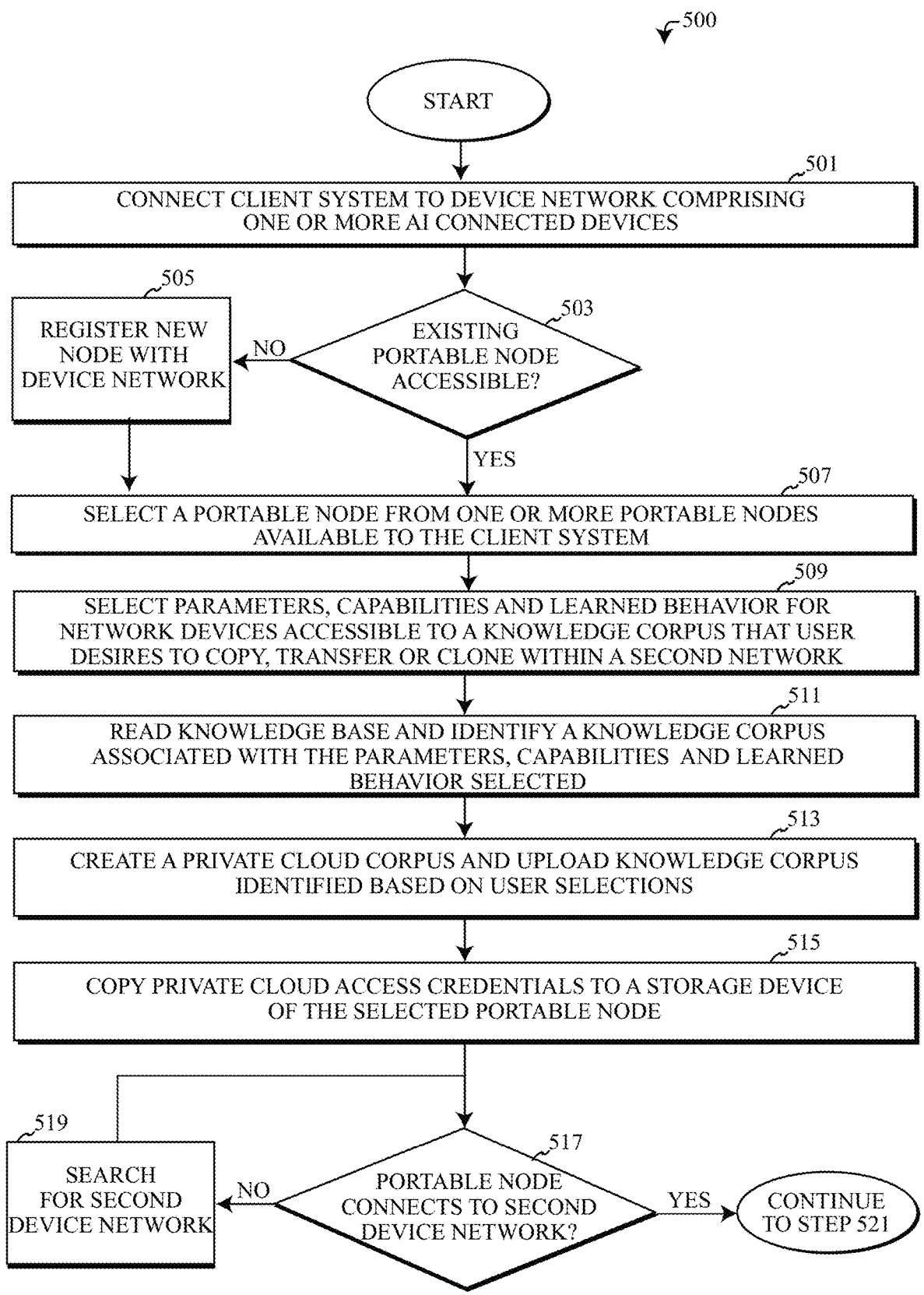
FIG. 5a depicts an embodiment of an algorithm implementing a computerized method for selectively sharing user-selected portions of a knowledge corpus between device networks, in accordance with the present disclosure.
Figure 5B:
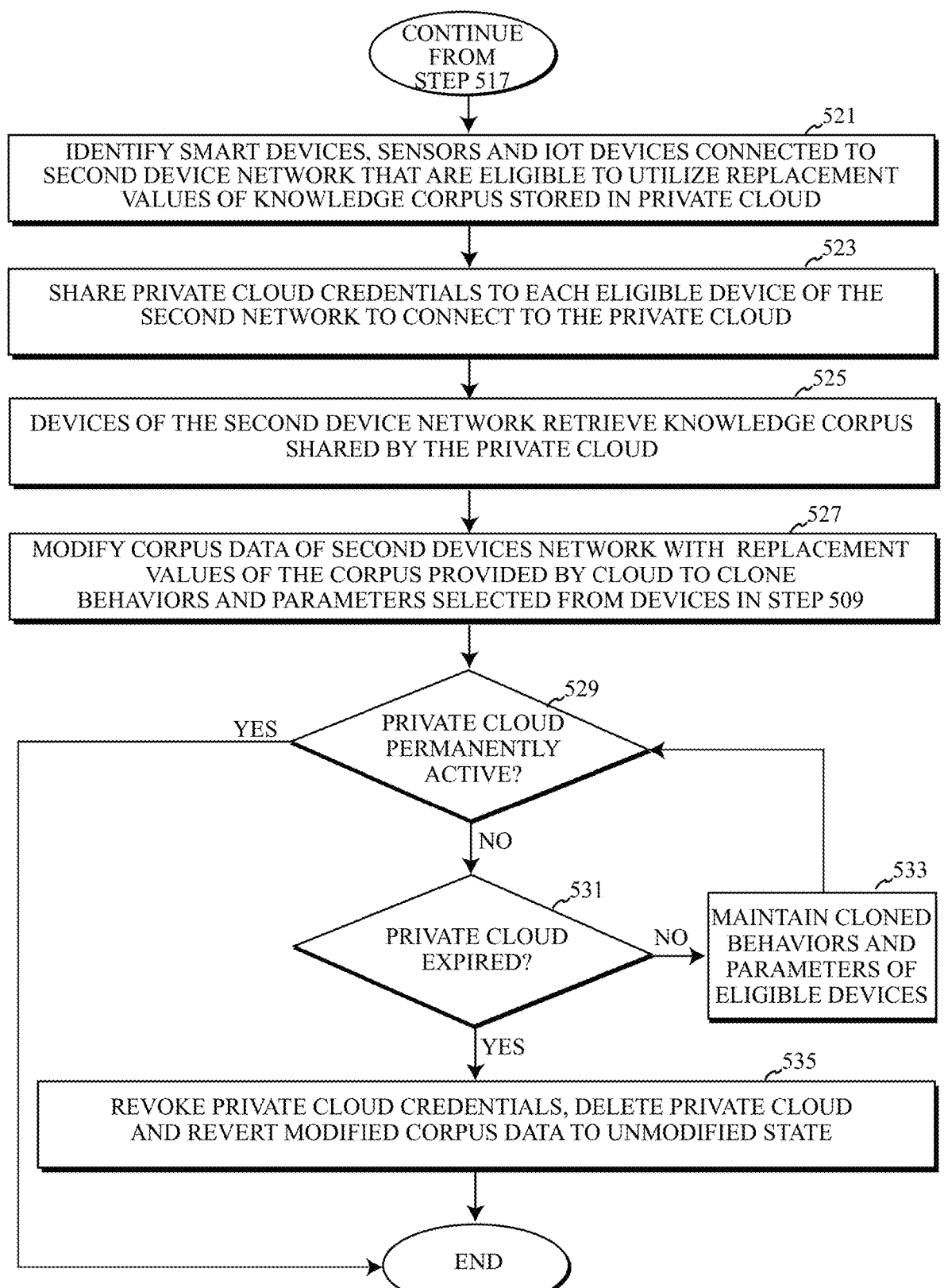
FIG. 5b depicts a continuation of steps in the algorithm of FIG. 5a implementing a computerized method for selectively sharing user-selected portions of a knowledge corpus between device networks.

The drawings of FIGS. 5a-5b represent an embodiment of an algorithm 500 performing a computer-implemented method for selectively sharing a private knowledge corpus 137 associated with a device network 150 comprising a plurality of AI devices 119, 120, 122 in order to recreate and/or transfer the parameters, capabilities, features, and behaviors of the A devices 119, 120, 122 to a second set of A devices 169, 171, 173 connected to a second device network 161 of a second computing environment 160. The implemented algorithm 500, as shown and described by FIGS. 1a-4, may use one or more computer systems defined generically by data processing system 10 of FIG. 1a and more specifically by the embodiments of specialized data processing systems 10 depicted in FIGS. 1a-4 as described herein. A person skilled in the art should recognize that the steps of the method described in FIGS. 5a-5b may be performed in a different order than presented. The algorithm 500 may not necessarily require all the steps described herein to be performed. Rather, some embodiments of algorithm 500 may alter the methods by performing a subset of steps using one or more of the steps discussed below.

Embodiments of the algorithm 500 may begin at step 501. In step 501, a client system 101 may connect to a device network 150. Embodiments of the device network 150 can include one or more AI devices 119, 120, 122 which may be integrated into the device network 150. Embodiments of the AI devices 119, 120, 122 may be capable of collecting device data 121 associated with the user(s) of the device network 150, for the purpose of creating or improving the knowledge base 127 and/or use corpus data 125 of the knowledge corpus 129 in order to automate, respond or predictively anticipate responses to user requests or uses of the device network 150. Embodiments of the client system 101 may search for one or more available portable nodes 109, which may also be connected to the device network 150. Connections to the available portable node(s) 109 of the device network 150 may be facilitated based on communications with the portable node(s) 109 through the portable node API 107.

As part of the search for an available portable node 109 connected to the device network 150, a determination may be made by the algorithm 500 in step 503, whether or not an existing portable node 109 is accessible. Accessibility may be determined based on whether a portable node 109 is currently connected to the device network 150 in some embodiments, or whether the portable node 109 has been assigned another function or task, that would make the portable node 109 temporarily unavailable. In some embodiments, the client system 101 connected to the device network 150 may also be the portable node 109 that may be programmed for sharing knowledge corpus 129 information to a second device network 161. If in step 503, an existing portable node 109 is determined to be unavailable by the client system 101, the algorithm 500 may proceed to step 505, wherein the device client system 101 may register a new portable node 109 with the device network 150. Conversely, if an existing portable node 109 is accessible to the device network 150, the algorithm may proceed to step 507.

In step 507 of the algorithm 500, the client system 101 selects the portable node 109 from a list of available portable nodes 109 accessible to the device network 150, for which the client system 101 may create and/or upload with private cloud credentials 115 associated with a private cloud 135 containing a private knowledge corpus 137. In step 509 of algorithm 500, a user may select one or more parameters, capabilities, learned user patterns, behaviors and/or preferences of the device network 150 and/or AI devices 119, 120, 122 of the device network 150, that a user may wish to share, copy or replicate within the environment 160 of a second device network 161.

In step 511, the client device 101 connected to the device network 150 may interface with the knowledge base 127 via a knowledge corpus interface 103. Embodiments of the client system 101 may read and/or analyze the knowledge base 127 in order to identify one or more knowledge corpuses 129 that may be associated with the user-selected parameters. As part of identifying suitable knowledge corpus 129 for implementing the user-selected parameters, the client system 101 may further indicate portions of the knowledge corpus 129 that may indicate one or more replaceable variables of the knowledge corpus capable of being assigned a replacement value within a second knowledge corpus 165 or corpus data 175 stored by AI devices 169, 171, 173 of a second device network 161. In step 513, the client system 101 may create a private knowledge corpus 137 from the knowledge corpus 129 identified in step 511 based on the user-selected parameters. The private knowledge corpus 137 may be hosted by a private cloud 135 and made accessible via private cloud credentials 115, which may be generated by the client system 101. Part of the private knowledge corpus 137 hosted by the private cloud 135 may include selected knowledge corpuses 129 of the knowledge base 127 uploaded to the private cloud 135, as well as temporal cloud setting 139 which may define a length of time that the private knowledge corpus 137 may be shared with a second device network 161 via the private cloud 135.

In step 515 of the algorithm 500, the client system 101 or the private cloud module 131 may generate and/or copy the private cloud credentials 115 of the private cloud 135 to the portable node 109 selected in step 507. In the exemplary embodiments, the private cloud credentials 115 may be stored on a node storage 113 device, wherein copies of the private cloud credentials 115 may be replicated and shared with one or more AI devices 169, 171, 173 of the second device network 161 being targeted for customization, replication or cloning of the computing environment 160 to selectively match portions of computing environment 100. In step 517, a determination is made whether the portable node 109 has connected to the second device network 161. If in step 517, the determination concludes that the portable node 109 has not connected to the second device network 161, the algorithm 500 may proceed to step 519, wherein the portable node 109 may continue to search for and connect to the second device network 161. Conversely, if the determination is made in step 517 that the portable node 109 has connected to the second device network 161, the algorithm may proceed to step 521.

During step 521 of algorithm 500, the portable node 109 connected to the second device network 161 may identify one or more AI devices 169, 171, 173, such as one or more sets of smart devices 169, IoT devices 171 and/or sensor devices 173, that are eligible to implement one or more of the user-selected parameters within the second device network 161. In step 523 of the algorithm 500, the portable node 109 may share the private cloud credentials 115 with each AI device 169, 171, 173 of the second device network 161 that is identified by the portable node 109 to be eligible for implementing one or more of the user-selected parameters. Each A device 169, 171, 173 receiving private cloud credentials 115 from the portable node 109 may connect to the private cloud 135 using the private cloud credentials 115 and access the private knowledge corpus 137 hosted therein.

In step 525 of algorithm 500, each of the AI devices 169, 171, 173 of the second device network 161 that received the private cloud credentials 115 in step 523, may retrieve shared corpus data provided by the private knowledge corpus 137 being hosted by the private cloud 135. In some embodiments, each of the AI smart devices 169, 171, 173 may individually store the shared corpus data provided by the private knowledge corpus to one or more storage devices connected to the AI devices 169, 171, 173. In some embodiments, the shared corpus data provided by the private knowledge corpus 137 may be downloaded to a network-accessible repository and may be accessible to the AI devices 169, 171, 173 of the second device network 161. In some embodiments, the second knowledge corpus 165 of the second device network 161 may directly access the portable node 109, receive the private cloud credentials and download the private knowledge corpus 137 to the second knowledge corpus 165 directly.

In step 527 of algorithm 500, the shared corpus data accessible to each of the eligible AI devices 169, 171, 173 capable of implementing one or more user-selected parameters, may be modified using the replacement values provided by the private knowledge corpus 137 to the AI devices 169, 171, 173. As a result of the modification of the existing values of the corpus data 125 with the private knowledge corpus 137, modified corpus data 175 may be created that is capable of influencing the operations, learned patterns and behaviors, functions, capabilities and device settings 123 of the affected AI device 169. 171, 173. Further resulting in a computing environment 160 that is at the very least, a partial clone of the computing environment 100, wherein AI devices 169, 171, 173 imitate, mimic and/or operate in accordance with the user-selected parameters to fulfill one or more roles, functions and/or behaviors analogous to AI devices 119, 120, 122 of the device network 150.

In step 529 of algorithm 500, a determination may be made whether the temporal cloud setting 139 of the private cloud 135 hosting the private knowledge corpus 137 are created to remain active indefinitely (i.e. an infinite time limit). If the private cloud 135 is instructed to indefinitely host the private knowledge corpus 137, the private cloud 135 will continuously host the private knowledge corpus 137 and allow any additional AI devices 169, 171, 173 receiving the private cloud credentials 115 to connect to the private cloud 135. Moreover, as access to the private knowledge corpus 137 continues, the corpus data 125 of the AI devices 169, 171, 173 may continue to remain as modified corpus data 175 so long as access to the private knowledge corpus remains. Conversely, if the private cloud 135 is not activated for an indefinite period of time, the algorithm 500 may proceed to step 531, wherein a further determination may be made whether the activation period for the private cloud has expired. If in step 531, a determination is made that the private cloud 135 has not expired, the private cloud 135 remains active, and in accordance with step 533, the user-selected parameters applied to the AI devices 169, 171, 173 may remain in effect, continuing to maintain the learned behaviors, parameters, capabilities, settings, etc. cloned or imitated from the first device network 150 until the expiration time set by the temporal cloud settings 139. Otherwise, if the determination in step 531 indicates that the private cloud 135 has expired, the algorithm may proceed to step 535.

In step 535 of the algorithm 500, once the temporal cloud settings 139 have been determined to indicate that the access to the private cloud 135, and thus the access to the private knowledge corpus 137, has expired, the private cloud credentials 115 may be revoked and the private knowledge corpus 137 may be deleted from the private cloud 135 tasked with hosting the private knowledge corpus 137. Embodiments of the modified corpus data 175 may be reverted back to an unmodified state and the AI devices 169, 171, 173 may subsequently operate in the previous manner of operation prior to the replacement of one or more replacement variables with replacement values provided by the private knowledge corpus 137. Returning the second device network 161 and/or the AI devices 169, 171, 173 to a previous pattern of behavior, settings, and parameters that may be influenced by the user-selected parameters shared by first device network 150.

What is claimed is:

1. A computer-implemented method comprising:
    selecting, by at least one processor, one or more user-selected parameter, wherein the user-selected parameter includes at least one of a parameter, capability or learned behavior from a knowledge corpus created from data collected by a first set of network devices connected to a first device network;
    identifying, by the at least one processor, a node of the knowledge corpus, the node comprising at least one replacement variable comprising a replacement value associated with the user-selected parameter;
    creating, by the at least one processor, a private cloud corpus by uploading the knowledge corpus to a private cloud;
    sharing, by the at least one processor, access to the private cloud corpus with a second device connected to a second device network;
    substituting, by at least one processor, an existing value of a second knowledge base accessed by the second device with the replacement value provided by the private cloud corpus, wherein substituting the existing value with the replacement value modifies the second device to operate in accordance with the user-selected parameter of the first set of network devices; and
    permanently cloning a portion of an environment of the first device network imparted by the one or more user-selected parameter onto an environment of the second device network for a predetermined duration.

2. The computer-implemented method of claim 1, further comprising:
    selecting, by the at least one processor, a portable node connected to the first device network; and
    storing, by the at least one processor, access credentials to the private cloud corpus on a computer-readable storage device of the portable node, enabling the portable node to grant access to the private cloud corpus to the second device of the second device network.

3. The computer-implemented method of claim 1, wherein identifying the node of the knowledge corpus based on the user-selected parameter further comprises:
  analyzing, by the at least one processor, usage patterns and interest profiles of a user; and
  predicting an expected usage of the second device by the user within the second device network.

4. The computer-implemented method of claim 1, wherein substituting the existing value with the replacement value of the user-selected parameter enables one or more capabilities or features previously inaccessible to the second device.

5. The computer-implemented method of claim 1, wherein creating the private cloud corpus further comprises a step of establishing, by the at least one processor, a temporal time limit for accessing the private cloud corpus.

6. The computer-implemented method of claim 5, wherein upon expiration of the temporal time limit to access the private cloud corpus, substitution of the existing values with the replacement values is reversed, reverting the second device to a previous state prior to substituting the existing values with the replacement values.

7. A computer system comprising:
  at least one processor; and
  a computer-readable storage media coupled to the at least one processor, wherein the computer-readable storage media contains program instructions executing a computer-implemented method comprising the steps of:
    selecting, by the at least one processor, one or more user-selected parameter, wherein the user-selected parameter includes at least one of a parameter, capability or learned behavior from a knowledge corpus created from data collected by a first set of network devices connected to a first device network;
    identifying, by the at least one processor, a node of the knowledge corpus having at least one replacement variable comprising a replacement value associated with the user-selected parameter;
    creating, by the at least one processor, a private cloud corpus by uploading the knowledge corpus to a private cloud;
    sharing, by the at least one processor, access to the private cloud corpus with a second device connected to a second device network;
    substituting, by at least one processor, an existing value of a second knowledge base accessed by the second device with the replacement value provided by the private cloud corpus 137, wherein substituting the existing value with the replacement value modifies the second device to operate in accordance with the user-selected parameter of the first set of network devices; and
    permanently cloning a portion of an environment of the first device network imparted by the one or more user-selected parameter onto an environment of the second device network for a predetermined duration.

8. The computer system of claim 7, further comprising:
  selecting, by the at least one processor, a portable node connected to the first device network; and
  storing, by the at least one processor, access credentials to the private cloud corpus on a computer-readable storage device of the portable node, enabling the portable node to grant access to the private cloud corpus to the second device of the second device network.

9. The computer system of claim 7, wherein identifying the node of the knowledge corpus based on the user-selected parameter further comprises:
  analyzing, by the at least one processor, usage patterns and interest profiles of a user; and
  predicting an expected usage of the second device by the user within the second device network.

10. The computer system of claim 7, wherein substituting the existing value with the replacement value of the user-selected parameter enables one or more capabilities or features previously inaccessible to the second device.

11. The computer system of claim 7, wherein creating the private cloud corpus further comprises a step of establishing, by the at least one processor, a temporal time limit for accessing the private cloud corpus.

12. The computer system of claim 11, wherein upon expiration of the temporal time limit to access the private cloud corpus, substitution of the existing values with the replacement values is reversed, reverting the second device to a previous state prior to substituting the existing values with the replacement values.

13. A computer program product comprising:
  one or more computer-readable storage media having computer-readable program instructions stored on the one or more computer-readable storage media said program instructions executes a computer-implemented method comprising the steps of:
    selecting, by at least one processor, one or more user-selected parameter, wherein the user-selected parameter includes at least one of a parameter, capability or learned behavior from a knowledge corpus created from data collected by a first set of network devices connected to a first device network;
    identifying, by the at least one processor, a node of the knowledge corpus, the node comprising at least one replacement variable comprising a replacement value associated with the user-selected parameter;
    creating, by the at least one processor, a private cloud corpus by uploading the knowledge corpus to a private cloud;
    sharing, by the at least one processor, access to the private cloud corpus with a second device connected to a second device network;
    substituting, by at least one processor, an existing value of a second knowledge base accessed by the second device with the replacement value provided by the private cloud corpus, wherein substituting the existing value with the replacement value modifies the second device to operate in accordance with the user-selected parameter of the first set of network devices; and
    permanently cloning a portion of an environment of the first device network imparted by the one or more user-selected parameter onto an environment of the second device network for a predetermined duration.

14. The computer program product of claim 13, further comprising:
  selecting, by the at least one processor, a portable node connected to the first device network; and
  storing, by the at least one processor, access credentials to the private cloud corpus on a computer-readable storage device of the portable node, enabling the portable node to grant access to the private cloud corpus to the second device of the second device network.

15. The computer program product of claim 13, wherein identifying the node of the knowledge corpus based on the user-selected parameter further comprises:
  analyzing, by the at least one processor, usage patterns and interest profiles of a user;

and predicting an expected usage of the second device by the user within the second device network.

16. The computer program product of claim 13, wherein substituting the existing value with the replacement value of the user-selected parameter enables one or more capabilities or features previously inaccessible to the second device.

17. The computer program product of claim 13, wherein creating the private cloud corpus further comprises a step of establishing, by the at least one processor, a temporal time limit for accessing the private cloud corpus, whereupon expiration of the temporal time limit to access the private cloud corpus, substitution of the existing values with the replacement values is reversed, reverting the second device to a previous state prior to substituting the existing values with the replacement values.

* * * * *